(12) United States Patent
Holland et al.

(10) Patent No.: US 8,502,069 B2
(45) Date of Patent: *Aug. 6, 2013

(54) PROTECTIVE COVER

(75) Inventors: John E. Holland, Bailey, NC (US);
Connie W. Holland, Bailey, NC (US)

(73) Assignee: Advanced Composite Structures, LLC, Charleston, SC (US)

(*) Notice: Subject to any disclaimer, the term of this patent is extended or adjusted under 35 U.S.C. 154(b) by 1592 days.

This patent is subject to a terminal disclaimer.

(21) Appl. No.: 10/075,786

(22) Filed: Feb. 13, 2002

(65) Prior Publication Data

US 2002/0170728 A1 Nov. 21, 2002

Related U.S. Application Data

(63) Continuation-in-part of application No. 09/860,423, filed on May 18, 2001.

(51) Int. Cl.
*H01B 11/06* (2006.01)
*H01B 7/17* (2006.01)
*H01B 7/28* (2006.01)
*H01B 7/282* (2006.01)

(52) U.S. Cl.
CPC .. *H01B 7/17* (2013.01); *H01B 7/28* (2013.01); *H01B 7/282* (2013.01)
USPC .............. 174/36; 57/210; 57/212; 57/243; 428/36.9; 428/36.92; 139/383 R

(58) Field of Classification Search
USPC ........... 174/19, 36, 74 R, 74 A, 82; 428/36.3, 428/100, 192, 193, 36.9, 36.92, 34.1–5, 36.1, 428/35.7–8; 57/210, 243; 87/29.6; 139/383 R, 139/404, 408, 409, 420 R, 421, 426 TW, 139/420 A; 442/301
See application file for complete search history.

(56) References Cited

U.S. PATENT DOCUMENTS

| | | | | |
|---|---|---|---|---|
| 2,946,840 | A | | 7/1960 | Palmer .................. 174/136 |
| 3,060,069 | A | | 10/1962 | Sindars .................. 154/45 |
| 3,762,982 | A | | 10/1973 | Whittington .............. 161/47 |
| 3,847,183 | A | * | 11/1974 | Meyer .................. 138/177 |
| 3,962,554 | A | * | 6/1976 | Eigel .................. 150/154 |
| 4,194,082 | A | * | 3/1980 | Campbell ............... 156/86 |

(Continued)

FOREIGN PATENT DOCUMENTS

| | | |
|---|---|---|
| EP | 0 210 807 | 5/1989 |
| EP | 0 499 089 | 8/1992 |

(Continued)

OTHER PUBLICATIONS

Attachment 1—Applicant comments concerning Japanese Appln. No. 2003-567755 and Japanese Appln. No. 2002-592245 (1 sheet).

(Continued)

*Primary Examiner* — William H Mayo, III
(74) *Attorney, Agent, or Firm* — Womble Carlyle Sandridge & Rice, LLP

(57) ABSTRACT

A protective cover for lengths of materials used in environments in which the lengths of material are moved and pulled around and subjected to abrasion, chemicals, and weather extremes. The protective cover includes a sleeve that surrounds the length of material to be protected. The sleeve has open ends and is formed of a fabric made substantially of high performance yarns.

18 Claims, 6 Drawing Sheets

U.S. PATENT DOCUMENTS

| | | | | | |
|---|---|---|---|---|---|
| 4,281,211 | A | * | 7/1981 | Tatum et al. | 174/117 F |
| 4,371,578 | A | * | 2/1983 | Thompson | 138/167 |
| 4,413,110 | A | * | 11/1983 | Kavesh et al. | 526/348.1 |
| 4,639,545 | A | * | 1/1987 | Pithouse et al. | 139/425 R |
| 4,668,545 | A | * | 5/1987 | Lowe | 139/387 R |
| 4,684,762 | A | * | 8/1987 | Gladfelter | 139/425 R |
| 4,737,210 | A | * | 4/1988 | Dougherty | 156/148 |
| 4,737,402 | A | | 4/1988 | Harpell et al. | |
| 4,780,351 | A | * | 10/1988 | Czempoyesh | 428/102 |
| 4,784,886 | A | * | 11/1988 | Monget et al. | 428/36.1 |
| 4,791,236 | A | * | 12/1988 | Klein et al. | 138/166 |
| 4,803,103 | A | * | 2/1989 | Pithouse et al. | 428/34.5 |
| 4,847,447 | A | * | 7/1989 | Eiswirth et al. | 174/138 F |
| D302,547 | S | | 8/1989 | Steeley | D13/99 |
| 4,857,370 | A | * | 8/1989 | Overbergh et al. | 428/34.9 |
| 4,862,922 | A | | 9/1989 | Kite, III | 138/119 |
| 4,891,256 | A | * | 1/1990 | Kite et al. | 174/DIG. 11 |
| 4,900,596 | A | * | 2/1990 | Peacock | 428/34.5 |
| 4,930,543 | A | * | 6/1990 | Zuiches | 137/375 |
| 4,982,054 | A | * | 1/1991 | De Bruycker et al. | 156/49 |
| 5,070,597 | A | * | 12/1991 | Holt et al. | 138/103 |
| 5,164,237 | A | * | 11/1992 | Kaneda et al. | 138/125 |
| 5,178,923 | A | * | 1/1993 | Andrieu et al. | 428/100 |
| 5,200,245 | A | * | 4/1993 | Brodrick, Jr. | 24/304 |
| 5,300,337 | A | * | 4/1994 | Andrieu et al. | 428/100 |
| 5,326,604 | A | | 7/1994 | Williamson | 428/36.2 |
| 5,395,682 | A | * | 3/1995 | Holland et al. | 220/1.5 |
| 5,441,790 | A | * | 8/1995 | Ratigan | 428/100 |
| 5,445,883 | A | * | 8/1995 | Kobayashi et al. | 428/355 EN |
| 5,516,985 | A | * | 5/1996 | Merkel et al. | 174/138 F |
| 5,556,495 | A | * | 9/1996 | Ford et al. | 139/DIG. 1 |
| 5,796,045 | A | | 8/1998 | Lancien et al. | 174/109 |
| 5,843,542 | A | | 12/1998 | Brushafer et al. | |
| 5,965,223 | A | * | 10/1999 | Andrews et al. | 428/34.5 |
| 6,034,329 | A | | 3/2000 | Kawamura | 174/102 R |
| 6,145,895 | A | | 11/2000 | Patel et al. | 285/369 |
| 6,152,185 | A | | 11/2000 | Tucker | 138/110 |
| 6,205,623 | B1 | * | 3/2001 | Shepard et al. | 24/30.5 R |
| 6,280,546 | B1 | * | 8/2001 | Holland et al. | 156/85 |

FOREIGN PATENT DOCUMENTS

| | | | |
|---|---|---|---|
| EP | 0 278 707 A | * | 8/1998 |
| JP | 10-264902 | | 10/1998 |
| WO | WO 97/48940 | * | 12/1997 |

OTHER PUBLICATIONS

Attachment 1A—Communication from Adati & Kazahaya to Womble Carlyle, et al. dated Jul. 9, 2008 concerning filing of amendment with Japanese Patent Office (Japanese Appln. No. 2003-567755) and accompanying amendment (in Japanese language and English translation thereof) and amended claim set (22 sheets); Communication from Adati & Kazahaya to Womble Carlyle, et al. dated Mar. 9, 2009 concerning filing of amendment with Japanese Patent Office (Japanese Appln. No. 2003-567755) (English translation thereof only) (6 sheets).

Attachment 1B—Certificate of Japanese Patent No. 4298514 (2 sheets).

Attachment 1C—Communication from Adati & Kazahaya to Womble Carlyle, et al. dated Jul. 23, 2008 concerning filing of amendment with Japanese Patent Office (Japanese Appln. No. 2002-592245) and accompanying amendment (English translation thereof only) and amended claim set (10 sheets).

Attachment 2—Applicant comments concerning European Appln. No. 02771836.0 and European Appln. No. 03711000.4 (1 sheet).

Attachment 2A—Letter from Baron Warren Redfern of Mar. 31, 2009 concerning filing of amendment with European Patent Office ( European Appln. No. 02771836.0-2207) (3 sheets), amendment (9 sheets), amended claim set (2 sheets), drawings (6 sheets), Acknowledgement of receipt (1 sheet), Letter accompanying subsequently filed items (1 sheet), amendment (9 sheets), claim set (2 sheets), Letter to Baron Warren Redfern from European Patent Office dated Dec. 2, 2008 concerning examination (5 sheets), Supplementary European Search Report (1 sheet).

Attachment 2B—Communication from European Patent Office to Baron Warren Redfern of Oct. 8, 2009 concerning grant (European Appln. No. 02771836.0) (5 sheets).

Attachment 2C—Letters Patent (European Pat. No. 1 483 156) (16 sheets).

Attachment 3—Applicant comments concerning Canadian Appln. No. 2,447,325 (1 sheet).

Attachment 3B—Notice of Allowance (Canadian Appln. No. 2,447,325) (1 sheet).

Attachment 4—Applicant comments concerning Mexican Appln. No. PA/a/2003/010500 and Appln. No. PA/a/2004/007902 (1 sheet).

Attachment 4A—Communication from Goodrich, Riquelme Y Asociados dated Jul. 19, 2007 (Mexican Appln. No. PA/a/2003/010500) concerning issuance of Office Action (3 sheets).

Attachment 4B—Mexican Patent No. 256113 (2 sheets).

Attachment 5—Applicant comments concerning Indonesian Appln. No. WO0200401701 (1 sheet).

Attachment 6—Applicant comments concerning Australian Appln. No. 2003215186 (1 sheet).

Attachment 6A—Communication from Australian Patent Office to Watermark dated Jan. 15, 2007 (Australian Appln. No. 2003215186) concerning last proposed amendment No. 1 (2 sheets), Communication from Watermark to Australian Patent Office dated Dec. 11, 2006 re: submissions in response to Report No. 1 (3 sheets), Notice of Entitlement (1 sheet), Statement of Proposed Amendments dated Dec. 11, 2006 (5 sheets), Communication from Australian Patent Office to Watermark dated Sep. 20, 2006 re: last proposed amendment No. (2 sheets).

Attachment 7—Applicant comments concerning New Zealand Appin. No. 534647 (1 sheet).

Attachment 7A—Examination Report dated Nov. 20, 2006 concerning New Zealand Appin. No. 534647 ( 2 sheets), Letter from Watermark to Australian Patent Office dated Sep. 11, 2006 concerning submissions in response to Report No. 1 (3 sheets), proposed amendments (6 sheets), Examination Report dated Dec. 8, 2005 (3 sheets).

Communication from Adati & Kazahaya to Womble Carlyle, et al., dated Mar. 10, 2010 (Japanse Appln. Nos. 2002-592245 & 2003-567755) concerning English translations of the following responses: (1) Response filed Jul. 9, 2008 for Appln. No. 2003-567755; (2) Response filed Mar. 9, 2009 for Appln. No. 2003-567755; (3) Response filed Jul. 23, 2008 for Appln. No. 2002-592245) (10 sheets).

* cited by examiner

PROTECTIVE COVER

RELATED APPLICATIONS

This application is a continuation-in-part of application Ser. No. 09/860,423 filed May 18, 2001, now pending, the content of which is incorporated herein by reference in its entirety.

FIELD OF THE INVENTION

The present invention relates to the field of protective coverings, and, more particularly to a protective cover for lengths of material such as ropes, tethers, lanyards, etc. of the type that are likely to be subjected to continuous abrasion and/or exposure to undesirable environmental conditions or chemicals.

BACKGROUND OF THE INVENTION

As the industrial complex in the United States and abroad has grown over the last century, so has the demand for reliable means for transporting electricity, communications signals, and fluid media. Early constructions of power lines and pipeline systems proliferated, but they have not been without attendant unreliability and lack of service durability. For example, overhead insulated power lines have been susceptible to wear and abrasion from trees. Sandpaper-type wrappings have been attempted to counter these effects. Windings of fiberglass and rubber have been applied to protect underwater-type cables and conduits from rocks, coral, and seawater. Braided metal and plastic sheathings have been developed to protect certain types of cables and hoses; however, these have been bulky and too rigid for many applications. Narrow bands of rigid materials have been developed for reducing the friction between a hose and an abrasive surface by placing the bands at regular intervals along the length of a hose; however, exposure of the unbanded surface area of these hoses to the elements and to chemicals continues to be problematic.

In certain industries, such as the airline industry, fuel hoses and electrical cables, encased only in rubber or other soft insulating materials, must be pulled and dragged across abrasive surfaces, such as concrete and asphalt, to service aircraft. In many airports, the hose and/or cable must be moved over an abrasive service many times during a single day. The surface may be wet or have gasoline or chemicals thereon. The wear on conventional hoses causes frequent replacement to be necessary. Substantial annual costs to replace worn cables and hoses have thus been common. Further, constant exposure to the elements and to ultraviolet radiation accelerates the interval between replacements. Since these cables and hoses are produced to meet commercial federal industry safety standards, costs of $15 per foot, or more, are not uncommon. Yet, there has not heretofore been an effective, practical, solution to this problem.

In the construction and heavy equipment industry, electrical cables and hydraulic lines are constantly subjected to abrasion as the cables and lines slide back and forth against unclean equipment surfaces under constant exposure to the elements and ultraviolet radiation. The same is true in the transportation industry, where for example, mooring lines for large and small watercraft are continuously being dragged or pulled about in docking. These are just a few of the many industries where lengths of cable, hose, rope, etc. are frequently replaced due to premature wear and deterioration. Yet, there has not heretofore been an effective, practical, solution to these problems.

SUMMARY OF THE INVENTION

The present invention is directed to a simple, yet effective, abrasion-resistant protective system for lengths of material such as hoses, cables, ropes, etc. of the type used in high abrasion applications.

In its simplest construction, the present invention comprises a protective covering, or sleeve, having open ends to be fitted over substantially the entire surface area of the length of material to be protected. As used herein, "length of material" refers to ropes, cables, hoses, conduit, and the like, regardless of material composition. Also, as used herein, "rope" includes, but is not limited to ropes, cords, braids, strands, tapes, lines, lanyards, tethers, halyards, etc., formed from either natural or synthetic materials, or both.

The protective cover is constructed from a woven fabric formed primarily from high-strength (high performance) yarns. As used herein, "high-strength yarns" refers to the entire family of yarns that have a tensile modulus equal to or greater than 150 grams/denier and a tenacity equal to or greater than 7 grams/denier. Such high strength yarns may be formed from long chain polyethylene fibers (known as SPECTRA®), aramids such as KEVLAR® (Dupont), liquid crystal polymers such as VECTRAN® (Hoechst Celanese), or combinations thereof. The preferred yarn for the fabric is available from suppliers, such as Allied Signal, under the tradename SPECTRA®. Fabrics woven or knitted from selected one of these yarns have a high level of tear-resistance, abrasion-resistance, cut-and-stab resistance, ultraviolet radiation resistance, and resistance to chemicals and low temperatures. These characteristics improve both the strength and durability of the fabric. In addition, fabric so formed is only about one-third the weight of conventional fabrics like vinyl-coated nylons and polyesters.

In one embodiment, the protective cover is constructed as a sleeve that may be easily and quickly installed over an existing cable or hose, and just as quickly and easily removed or replaced. Accordingly, the protective cover is initially formed a length of abrasion-resistant fabric with attaching elements along opposed edges. The length of fabric is dimensioned so that the width of the fabric sheet is slightly greater than the circumference of the cable or hose with which the sleeve is intended for use, and the length of the fabric sheet approximates the total length of cable or hose to be protected. The fabric is a woven single layer with a preferred weight of between about 5 and 8 ounces per square yard; however, the cover is not weight limited. Thus, the warp and fill yarns are of a weight in the range of 400 to 1,000 denier with warp and fill picks of 30 to 36 yarns per inch each. The range of parameters of this single fabric layer is designed to provide a fabric that is extremely lightweight and flexible, while also providing sufficient strength and long-lasting durability to withstand the use and environment to which a cable and hose cover is exposed in the referenced applications.

While not required for abrasion-resistance, a lightweight coating or lamination is provided on the outer surface of the protective cover to enhance the penetration resistance of the fabric by fluids, chemicals, and particulate matter where such additional protection is desired. It has been found that a thermoplastic film of polyethylene or ethylene vinyl acetate suitably bonds to fabrics formed from high-strength yarns, including SPECTRA®.

Means for fastening the length of fabric and holding it in place are affixed along the opposed longitudinal edges of the fabric length. An important advantage of this aspect is that the sleeve so formed may be easily installed or removed (in the case of replacement) from cables or hoses without the need for disconnecting or disassembling the hoses or cables from their installed applications. Thus, the protective cover of the present invention may be easily fitted over a hose or electrical cable that is presently in service without having to disrupt operations by uncoupling the hose or cable or removing the fittings therefrom. The fasteners preferred for this application are hook and loop strips that allow the sleeve to be completely closed along its entire length. Hook and loop fastening strips are most commonly available under the trademark VELCRO®. To ensure extra holding capability, either multiple strips may be used or wider strips may be affixed to the edges of the length of fabric. Alternatively, other fasteners such as snaps, ties, and the like could be used.

Another embodiment of the present invention is in the form of short lengths of protective coverlets constructed from the fabric described above. In applications where the entire cable or hose does not have to be covered, as in the case where abrasion alone is the primary concern, a series of spaced apart narrow coverlets, or protective bands, may be wrapped around the cable or hose at selected intervals and fastened as described above.

A further embodiment of the present invention is directed to an abrasion-resistant cable or hose construction in which a permanently affixed outer protective layer, formed substantially from high strength yarns. The outer layer may be either adhered to the hose or cable with adhesives or cement that are resistant to chemical attack, or the fabric may be imbedded or impregnated into the outer surface of the cable or hose during the manufacture thereof.

It has also been found that, in addition to covering materials such as cables and hoses, the present invention, as described herein, can be used to cover a wide spectrum of other lengths of material. For example, mooring lines used in the maritime industry require frequent replacement due to constant abrasion and exposure. Other tethers and fastening lengths used in construction, on heavy equipment, and any other source of exposure and/or abrasion, will benefit from the protection offered by the protective cover of the present invention. Likewise, the resistance that the protective cover of the present invention has to chemical exposure and ultraviolet radiation makes it attractive for covering literally any type of material length. Thus, whether the length of material itself is used for conveying, restraining, binding, etc., the protective cover of the present invention has applicability.

These and other aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed.

DETAILED DESCRIPTION OF THE PREFERRED EMBODIMENTS

Figure 1:
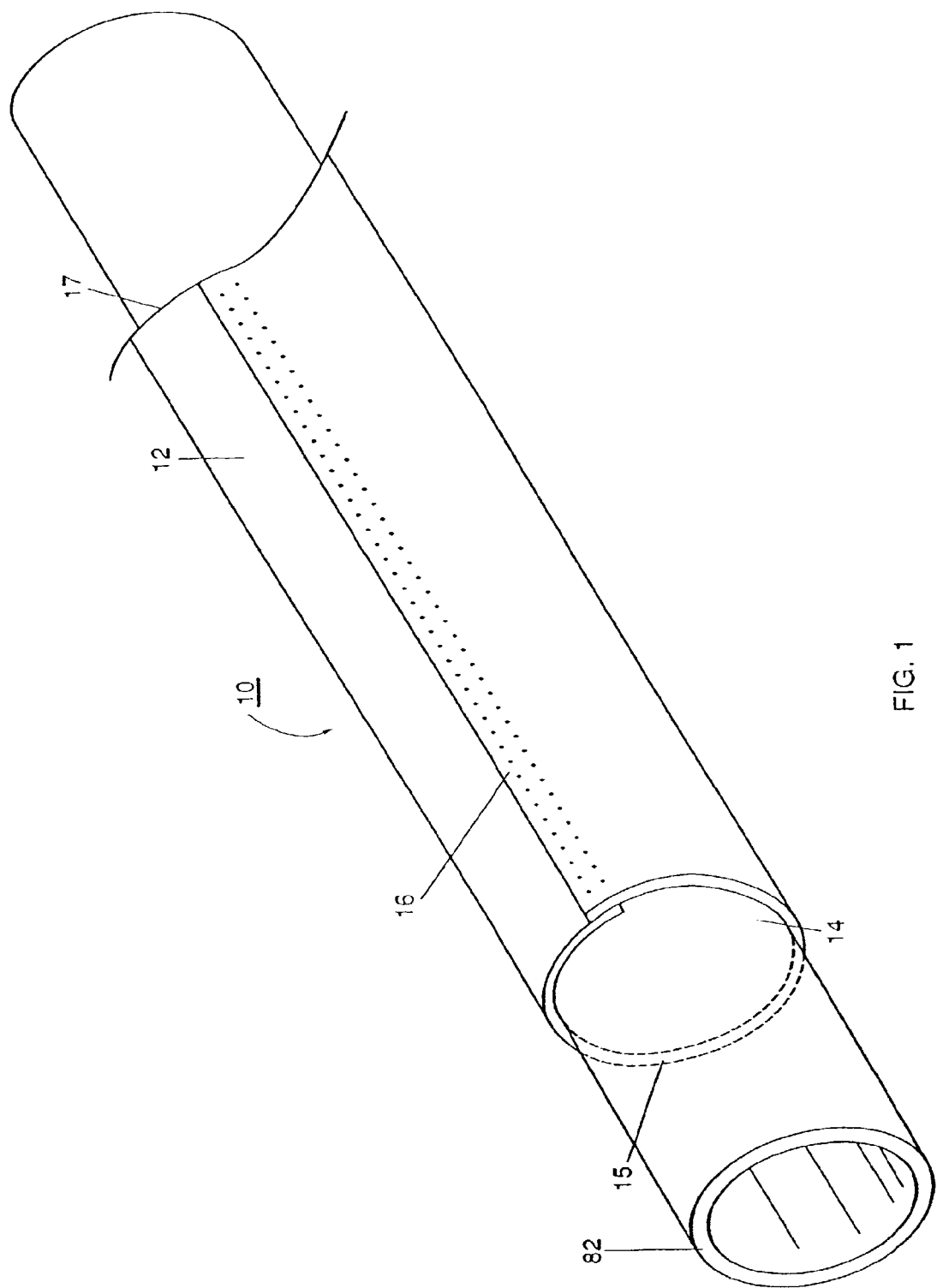
FIG. 1 is a perspective view of a protective cover form from a fabric of high-performance yarns.

As shown in FIG. 1, one aspect of the present invention is directed to a a simple, yet effective, abrasion-resistant protective system for lengths of material such as hoses, cables, ropes, etc. of the type used in high abrasion applications, such as the airline industry. Shown generally as 10 in FIG. 1, in its simplest form the protective cover comprises a sleeve having an outer surface 12, an inner surface 14, and open ends 15, 17. Protective cover 10 is formed from a singular length of woven fabric with a single layer that is sewn together along longitudinal edges to form a seam 16.

The fabric used to form the abrasion-resistant and cut-resistant protective cover is woven from high-strength yarns. As used herein, "high strength yarns" means yarns formed from fibers having a tensile modulus equal to or greater than 150 grams/denier and a tenacity equal to or greater than 7 grams/denier. In the preferred embodiment, the yarns used to form the woven sheet are formed from long chain polyethylene fibers available from suppliers, such as Allied Signal, under the trademark SPECTRA®. Other acceptable yarns may be formed from aramids, such as KEVLAR® or liquid crystal polymers, such as VECTRAN®. Fabric so formed from SPECTRA®, for example, has a high level of tear-resistance, abrasion-resistance, cut-and-puncture-resistance, resistance to low temperatures, and resistance to chemicals such as aviation fuel and oils. It also retains its durability after prolonged exposure to ultraviolet radiation. Additionally, the fabric is only about ⅓ the weight of conventional fabrics like nylon and polyester.

Figure 2:
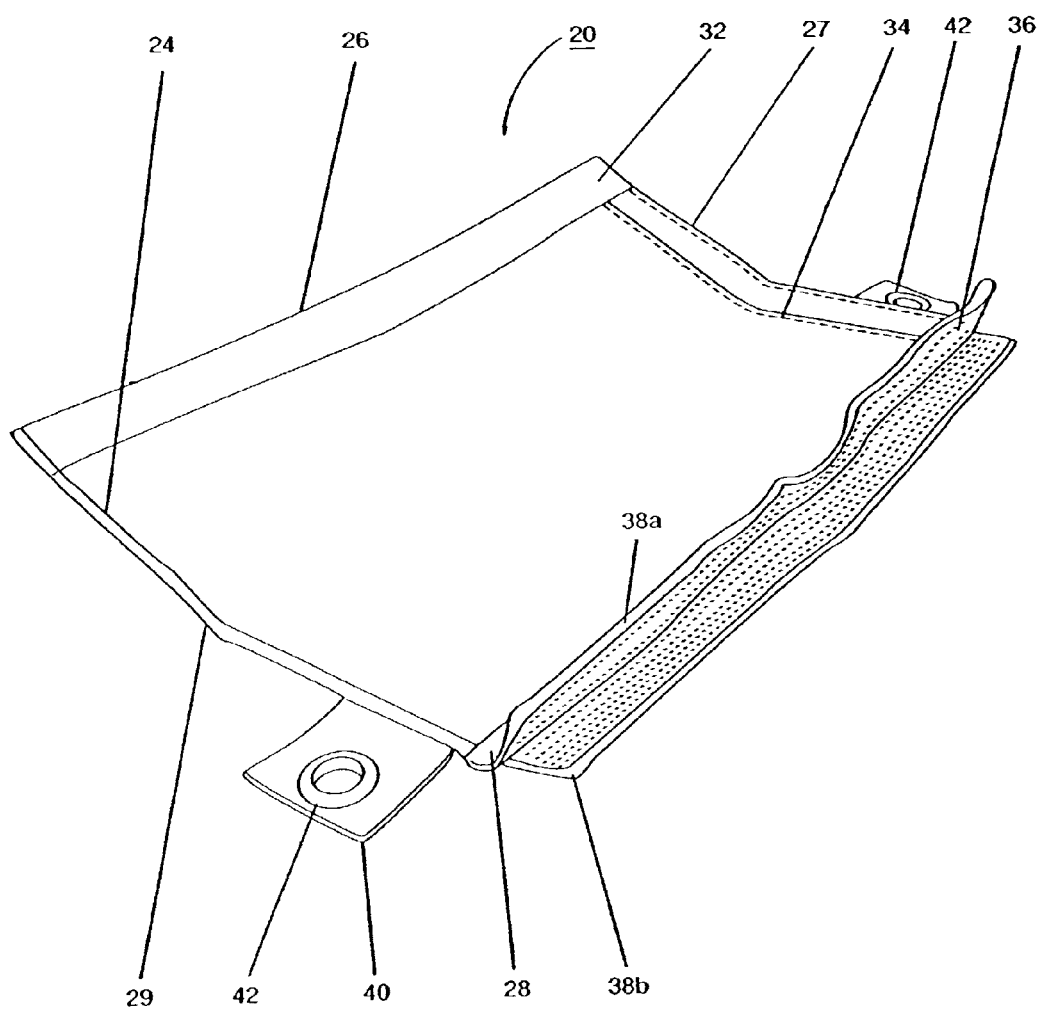
FIG. 2 is a perspective view of a protective cover with reclosable fasteners affixed along opposed longitudinal edges.

As shown in FIG. 2, in the preferred embodiment, protective cover 20 is constructed as a wrap. The wrap is formed as an elongated sheet having an outer surface 22 and an inner surface 24, opposed longitudinal edges 26, 28, and opposed ends 27, 29. The woven fabric sheet is a single layer with a preferred weight between about 5 and 8 ounces per square yard. Hems are sewn into the edges 26, 28 and ends 27, 29 to prevent raveling thereof. The warp and fill yarns are desirably in the range of between about 400 and 1,000 denier and the warp and fill picks are in the range of about 30 to 36 yarns per inch each. However, the range of possible deniers and picks per inch are not limited thereto. As those skilled in the art will appreciate, a lighter or heavier fabric having a more open or more closed weave may be selected to construct a protective cover for a specialized application. Likewise, the fabric need not be formed from a single yarn. For instance, in applications in which protective cover 20 may be subjected to tensile stresses in the horizontal axis that could create "creep," or stretching, the fabric may be formed with a blend of yarns comprising up to 30% KEVLAR® with the SPECTRA® construction. That is, blended yarns formed from up to about 30% of such high-strength fibers, or in the alternative, up to about 30% of the yarn ends being formed entirely from high-strength filaments, would provide an acceptable combination. This blend of SPECTRA® and KEVLAR® has been found quite effective in reducing creep. Additionally, where cost is a key factor and susceptibility to wear less severe, small percentages of more conventional yarns such as polyester and nylon may be substituted. As would be expected, the resistance characteristics described hereinabove will be reduced in such constructions. As those skilled in the art will also appreciate, the fabric of the present invention may also be knitted or formed in other ways that are conventional and known in the textile arts.

To provide an additional level of wear resistance and to further enhance fluid or particulate penetration resistance of the fabric construction, a lightweight coating, or lamination 30, is applied on the outer surface 22. It has been found that a thermoplastic film of polyethylene or ethylene vinyl acetate suitably bonds to fabrics formed from high-performance yarns, including SPECTRA®. The process for applying lamination 30 is described in detail in co-pending application Ser. No. 08/957,431, incorporated by reference herein. While not required, lamination may also be applied to inner surface 24 as an additional measure of penetration resistance.

Figure 3:
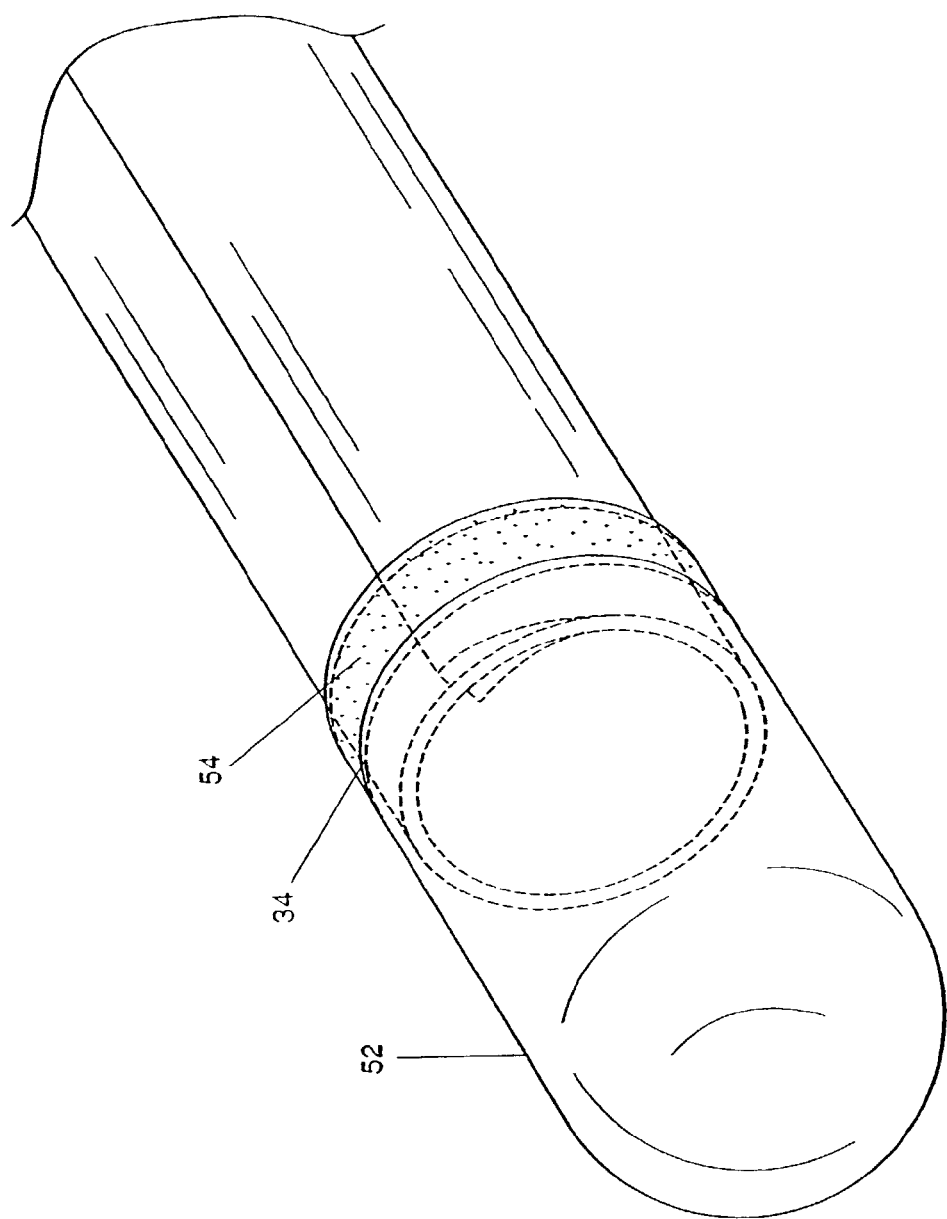
FIG. 3 is a perspective view of the protective cover of FIG. 1 or 2 with an optional end hood.

To enable protective cover 20 to be fitted and secured around a cable or hose, fasteners are provided along the opposed longitudinal edges 26, 28. As best seen in FIG. 2, narrow strips of hook 32 and loop 36 fasteners are affixed to opposed edges 26 and 28. These fastening strips are designed to engage one another along the entire surface area of contact between the strips, and are commercially available and widely known under the tradename VELCRO®. In the preferred embodiment, hook strips 32 are affixed to both sides of the woven sheet. Likewise, loop strips 36 are affixed to separate narrow flaps 38*a*, 38*b* that are joined at a seam along edge 28. This doubles the fastening capability of single strips of hook and loop material. As shown in FIG. 3, when protective cover 20 is fitted around a cable or hose, flaps 38*a*, 38*b* cover the strips 32 of hook material. Thus, the protective cover 20 may be fitted easily over an installed cable or hose without the need to disconnect or disassemble the cable or hose from its installed condition. Alternatively, and as those skilled in the art will appreciate, other types of fasteners or fastening material may substitute for VELCRO®. These include, but are not limited to adhesives, bands, snaps, buttons, zippers, etc.

Once protective cover 20 has been fitted over the cable or hose to be protected, the ends of the protective cover are further secured to the hose, cable, or accessories affixed thereto. Tabs 40 are formed at opposite ends 27, 29 of the elongated fabric sheet. Grommets 42 of brass or other materials having suitable strength are affixed to tabs 40. In this way, the user may choose to pass a cord, tie, chain, or other length of material through each of the grommets 42 to further secure protective cover 20 to the ends of the hose or cable or to an attached structure.

As an accessory to protective cover 20, a separate protective hood 52 is provided. As shown in FIG. 3, hood 52 is formed of the same material as cover 20 and is desirably formed from a single piece of material; however, it may be formed from multiple pieces that are sewn together along multiple seams. Hood 52 is intended to protect the exposed ends of cables or hoses when they are not in use to prevent damage to those exposed ends and to prevent infiltration by contaminants. Referring again to FIG. 2, hood 52 may be secured to cover 20 with VELCRO® material in a manner similar to the fasteners described hereinabove. Hood strips 34 may be affixed to either or both ends of the elongated sheet. Likewise, a loop strip 54 may be affixed around the inside periphery of hood 52. Alternatively, hood 52 may be affixed by other means known in the art or simply formed to be snugly fitted over the exposed end with elastic bands or the like.

Figure 4:
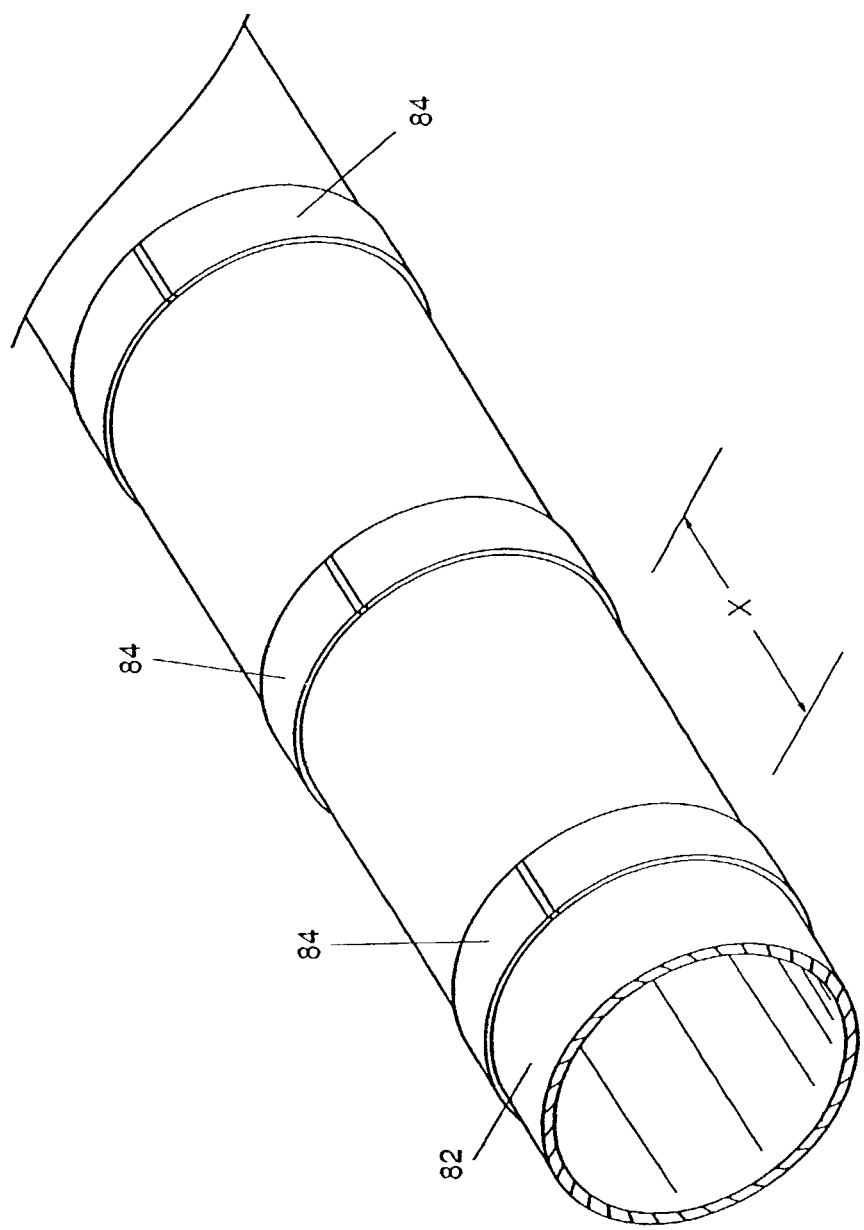
FIG. 4 is a perspective view of spaced-apart protective coverlets constructed in accordance with the present invention.

As shown in FIG. 4, another aspect of the present invention is to provide protective coverlets 84, or bands, that may be wrapped around hoses or cables 82 at spaced-apart intervals. Such coverlets 84 would be most appropriate for applications where exposure to chemicals, weather, and ultraviolet radiation are not a concern. Depending upon the degree of protection against abrasion that is desired, the distance between coverlets, shown as 'X' may be shorter or longer. Coverlets 84 also offer the user the option of placing them at critical abrasion points based on wear history, etc. Coverlets 84 are formed in the same manner and from the same material as the elongated sheet in FIG. 2.

Figure 5A:
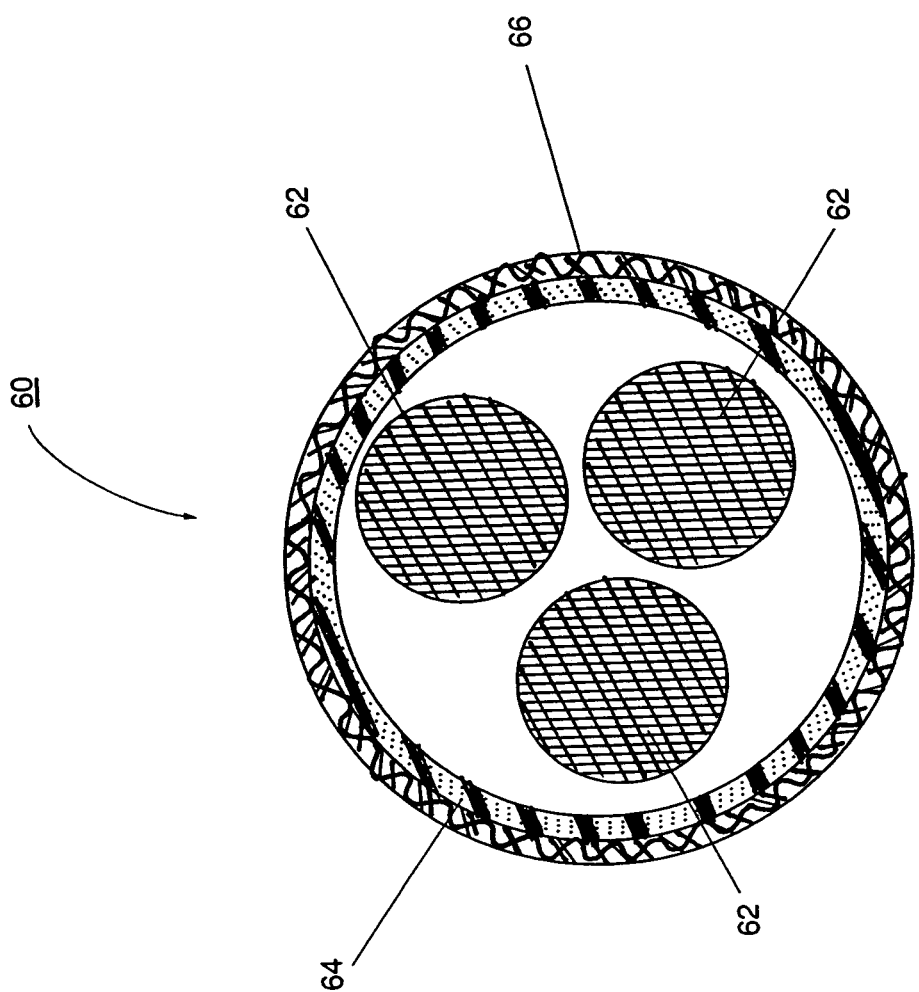
FIG. 5a is an end view of an abrasion-resistant cable having an outer layer of fabric formed from high-performance yarns.
Figure 5B:
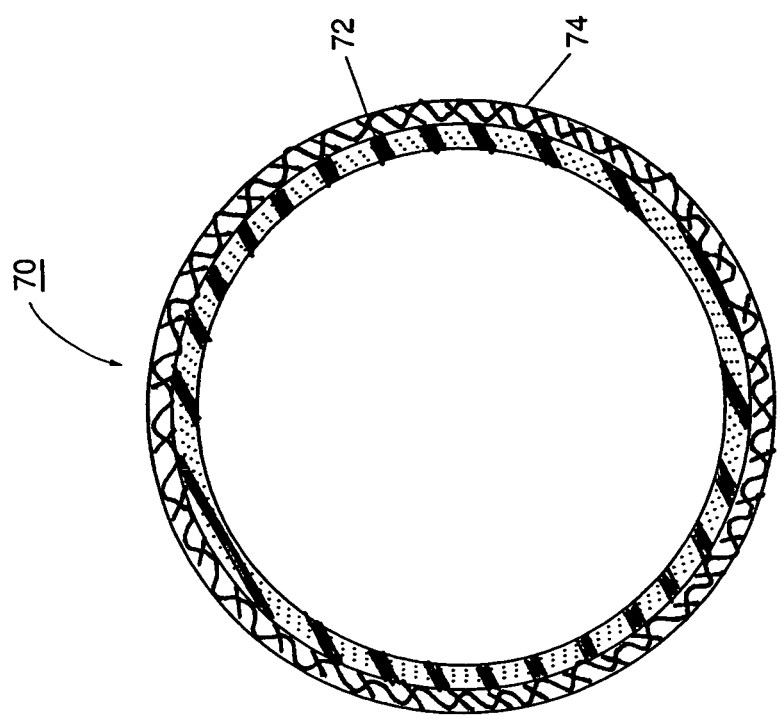
FIG. 5b is an end view of an abrasion-resistant hose having an outer layer of fabric formed from high-performance yarns.

A further aspect of the present invention is to provide an abrasion-resistant electrical cable 60 or fuel hose 70, having a protective layer permanently affixed thereto. As shown in FIG. 5*a*, at least one length of conductive material 62 such as copper or the like is encased by an insulating layer 64 such as rubber or insulating plastic. So formed, this is simply a conventional electrical cable well known in the art and widely used commercially without any further modifications thereof. However, for applications where such a cable is subjected to abrasive surfaces, an outer protective layer 66 formed from the woven fabric described hereinabove is permanently affixed to the intermediate insulating layer 64. The entire surface are of cable 60 is thus covered with the abrasion-resistant material. Outer layer 66 may be cemented or glued with commercial-grade adhesives known in the art. Alternatively, outer layer 66 may be pressed or impregnated into the outer surface of layer 64 using techniques well known to those in the art. Similarly, fuel hose 70 shown in FIG. 5*b* is formed from a substantially impermeable resilient material 72, such as rubber, resulting in a hollow core. The outer layer 74 of abrasion-resistant material may be affixed atop layer 72 in the same fashion that it is affixed to cable 60. Thus, in applications where users require more permanently formed abrasion-resistant cables or hose, those constructed according to the present invention provide the needed solution.

As described herein, the present invention can be used to cover a wide spectrum of other lengths of material, such as ropes, cables, mooring lines used in the maritime industry, tethers, lanyards, fastening lengths, etc. used in construction, on heavy equipment, and any other source of exposure and/or abrasion regardless of how the particular length of material is to be used. Likewise, the resistance that the protective cover of the present invention has to chemical exposure and ultraviolet radiation makes it attractive for covering literally any type of material length. Thus, whether the length of material itself is used for conveying, restraining, binding, etc., the protective cover of the present invention has applicability.

Although the present invention has been described with a preferred embodiment, it is to be understood that modifications and variations may be utilized without departing from the spirit and scope of the invention, as those skilled in the art will readily understand. Such modifications and variations are considered to be within the purview and scope of the appended claims and their equivalents.

We claim:

1. A protective sleeve for lengths of material such as electrical cable, hoses, ropes, hydraulic lines, tethers, and lanyards used in environments such as airports, docks, and construction sites in which said lengths of material are moved back and forth across abrasive surfaces and subjected to abrasion, chemicals, moisture, and weather extremes, said protective sleeve encasing said length of material, having open ends and formed of an elongated sheet consisting of a woven, lightweight fabric, with a thermoplastic film bonded to at least one side thereof, the fabric being made substantially of yarns formed primarily of long chain polyethylene fibers having a tensile modulus equal to or greater than 150 grams/denier, and a tenacity equal to or greater than 20 grams/denier, the yarns having a denier between 400 and 1000, the fabric having a warp and fill density of between 30 and 36 ends per inch, and the thermoplastic film selected from the group consisting of polyethylene and ethylene vinyl acetate, wherein the protective sleeve not only protects the lengths of material thereunder, but the fabric yarns themselves are resistant to deterioration from chemicals, fuels, as well as being highly resistant to abrasion, cuts, and the fabric of the sleeve is resistant to heat build-up as a result of relative movement between the sleeve and the length of material.

2. The protective sleeve of claim 1 wherein said fabric is formed from yarns containing at least 70 percent high performance yarns long chain polyethylene fibers.

3. The protective sleeve of claim 1 wherein said fabric has a weight of between about 5 and 8 ounces per square yard.

4. The protective sleeve of claim 1 wherein said sleeve is formed as an elongated sheet having opposed longitudinal edges, said opposed longitudinal edges including means releasably attaching said opposed longitudinal edges together around the length of said material.

5. The protective sleeve of claim 4 wherein said means for fastening said opposed longitudinal edges comprises hook and loop material.

6. The protective sleeve of claim 1 wherein said sleeve is formed as a plurality of bands, each band comprising a short length of said fabric, said bands being spaced apart along the length of said material.

7. The protective sleeve of claim 6 wherein each of said bands is formed as a short length of fabric having opposed longitudinal edges, said opposed longitudinal edges including means for fastening said opposed longitudinal edges together around the length of said material.

8. The protective sleeve of claim 7 wherein said means for fastening said opposed longitudinal edges comprises hook and loop material.

9. The protective sleeve of claim 1 further including a hood formed of the same fabric as said sleeve and fastened to at least one end of said sleeve for protecting an exposed end of said length of material.

10. An abrasion-resistant, cut-resistant, and tear-resistant protective cover system for airports, docks, and construction sites comprising:
(a) a length of material selected from the group consisting of electrical cables, hoses, ropes, hydraulic lines, tethers, and lanyards that must be periodically moved or pulled across abrasive surfaces and subjected to chemicals, moisture, and weather conditions; and
(b) a protective sleeve having open ends and encasing said length of material and formed of an elongated sheet consisting of a lightweight, woven fabric and a thermoplastic film bonded to at least one side thereof, the fabric made substantially of yarns formed primarily of long chain polyethylene fibers having a tensile modulus equal to or greater than 150 grams/denier and a tenacity equal to or greater than 20 grams/denier, the yarns having a denier between 400 and 1000, the fabric having a warp and fill density of between 30 and 36 ends per inch, and the thermoplastic film selected from the group consisting of polyethylene film and ethylene vinyl acetate, wherein said protective sleeve not only protects the lengths of material thereunder, but the fabric yarns themselves are resistant to deterioration from chemicals, fuels, as well as being highly resistant to abrasion, and the fabric of the sleeve is moisture-resistant, fuel-resistant, oil-resistant, abrasion-resistant, cut-resistant, tear-resistant, and resistant to heat build-up as a result of relative movement between the sleeve and the length of material.

11. The system of claim 10 wherein said fabric is formed from yarns containing at least 70 percent long chain polyethylene fibers.

12. The system of claim 10 wherein said fabric has a weight of between about 5 and 8 ounces per square yard.

13. The system of claim 10 wherein said sleeve is formed as an elongated sheet having opposed longitudinal edges, said opposed longitudinal edges including means for releasably attaching said opposed longitudinal edges together around the length of said material.

14. The system of claim 13 further including means for securing said open ends of the sleeve to said length of material.

15. The system of claim 10 wherein said sleeve is formed as a plurality of bands, each band comprising a short length of said fabric, said bands being spaced apart along the length of a material to be protected.

16. The system of claim 15 wherein each of said bands is formed as a short length of fabric having opposed longitudinal edges, said opposed longitudinal edges including means for fastening said opposed longitudinal edges together around the length of a material to be protected.

17. The system of claim 16 wherein said means for fastening said opposed longitudinal edges comprises hook and loop material.

18. The system of claim 10 further including a hood formed of the same fabric as said sleeve and fastened to at least one end of said sleeve for protecting an exposed end of said length of material.

* * * * *